United States Patent [19]
Chang

[11] Patent Number: 5,815,925
[45] Date of Patent: Oct. 6, 1998

[54] CARTRIDGE TIP CUTTING ASSEMBLIES FOR CAULK DISPENSING DEVICES

[76] Inventor: Peter J. Chang, 11001 Petersborough Dr., Rockville, Md. 20852

[21] Appl. No.: 679,737

[22] Filed: Jul. 12, 1996

[51] Int. Cl.[6] .................................................. B23D 21/06
[52] U.S. Cl. ............................... 30/92; 30/95; 30/289; 222/82; 222/83; 222/326; 222/391; 83/580
[58] Field of Search .................................... 30/92, 93, 95, 30/96, 112, 115, 289, 295; 7/129, 130, 131, 132; 83/580; 222/80–83, 83.5, 153, 192, 325, 326, 327, 391

[56] References Cited

U.S. PATENT DOCUMENTS

| | | | |
|---|---|---|---|
| 2,659,517 | 11/1953 | Reinhardt, Jr. | 222/82 |
| 4,135,644 | 1/1979 | Pacetti | 222/81 |
| 4,204,616 | 5/1980 | Chang | 222/391 |
| 4,493,437 | 1/1985 | Breeden | 222/82 |
| 4,802,607 | 2/1989 | Johnson | 222/82 |
| 5,197,635 | 3/1993 | Chang | 222/391 X |
| 5,211,312 | 5/1993 | Chang | 222/391 X |
| 5,295,614 | 3/1994 | Chang | 222/391 X |
| 5,381,931 | 1/1995 | Chang | 222/391 X |
| 5,529,225 | 6/1996 | Chang | 222/391 |

Primary Examiner—Maurina T. Rachuba
Attorney, Agent, or Firm—Law Offices Of Royal W. Craig

[57] ABSTRACT

Simple, inexpensive and efficient tip cutting assemblies for allowing an operator to cut the tip of a fresh cartridge of caulk prior to insertion in the barrel. The tip cutting assemblies are provided in the context of two general types of caulking guns having either a metal enclosed frame or single piece molded plastic open frame. In one embodiment for a molded open-frame gun, the cartridge tip cutting assembly includes a cutting bracket attached to the frame and having an aperture there through for insertion of the cartridge tip. The cutting assembly also includes a blade assembly attached to the trigger and extending a blade outwardly between the frame and cutting bracket. Another embodiment for a closed metal-frame gun includes an aperture through a side of the housing for insertion of a cartridge tip, and a tip-cutting member formed with a through-hole to pass the plunger shaft and riding thereon within the housing. The tip cutting member extends a cutting blade flush along the inner surface of the housing, and the tip-cutting member is moveable by operation of the trigger across the aperture. In both embodiments, a fresh cartridge tip can be cut by insertion in the aperture and by retraction of the trigger such that the tip-cutting blade cuts scissor-like across the aperture and through the tip.

7 Claims, 9 Drawing Sheets

CARTRIDGE TIP CUTTING ASSEMBLIES FOR CAULK DISPENSING DEVICES

FIELD OF THE INVENTION

The present invention relates to dispensing devices and, more particularly, to hand-held caulk guns for ejecting caulk compound from a disposable cartridge.

BACKGROUND OF THE INVENTION

Economy brand caulking guns are generally manual trigger-operated devices incorporating a unidirectional gripping assembly which urges a piston rod forward to eject the compound from a cartridge.

For example, FIG. 9 therein is a side perspective view of a molded open-frame hand-held caulk gun which generally includes a forward frame 10 for slidably guiding a piston 12 mounted at the distal end of a plunger shaft 14. The illustrated frame is adapted for carrying a conventional caulk cartridge. Plunger shaft 14 is carried in the open-frame, and a trigger 22 is pivoted at a screw hinge 24 located below plunger shaft 14. A plunger drive assembly includes an enlarged upper portion of trigger 22 extending past screw hinge 24. An offset drive pin 26 extends transversely through trigger 22 and bears against a grip 28. Grip 28 may be a flat elongate metal plate having a through-bore to pass plunger shaft 14. A compression spring 30 oppositely biases the grip 28 toward the trigger 22. The above-described components effect the forward operation of the plunger drive shaft 14. The trigger 22 is retracted by hand and pivots counterclockwise about screw hinge 24. The offset drive pin 26 bears against grip 28 and urges it forward. As grip 28 is biased forward from the bottom it reaches a critical angle where it engages plunger shaft 14, and further retraction of trigger 22 is converted into lateral movement of plunger drive shaft 14. When trigger 22 is released it is return-biased by compression spring 30 acting through grip 28, and trigger 22 and ultimately grip 28 pivot clockwise about pivot 24 to their home position (shown). As grip 28 moves toward an upright position it releases plunger shaft 14. In the case of molded open-frame caulk gun described above there currently is no satisfactory means on the gun for allowing an operator to cut the tip of a fresh cartridge of caulk. The construction of the molded open-frame gun does not render itself to incorporating economical or hazard-free tip-cutting devices.

In addition to the above-described type of molded open-frame gun, another gun generally employs a metal closed-frame. For example, FIG. 10 shows a closed metal-frame hand-held caulk gun with downwardly-pivoted trigger. In this case the plunger shaft 14 is carried in a closed frame housing 320, and a trigger 322 is pivoted at a screw hinge 324 located below plunger shaft 14. An enlarged upper portion of trigger 322 extends past screw hinge 324. The enlarged upper portion bears directly against a grip 328. Grip 328 may again be a flat elongate metal plate having a through-bore toward its lower end to pass plunger shaft 14. In forward operation, the trigger 322 is retracted by hand and pivots counterclockwise about screw hinge 324. The top edge of the upper portion of trigger 322 bears against grip 328 and urges it forward. As grip 328 is biased forward from the top it becomes more angled. Eventually grip 328 attains a critical angle where it engages plunger shaft 14, and further retraction of trigger 322 is converted into lateral movement of plunger drive shaft 14. Closed metal frame guns often do have built-in tip cutting assemblies since the construction of such guns enable the attachment of such devices. In some cases, a hole is provided on the handle for insertion of the cartridge tip, and the side of the trigger acts as a shearing blade. However, the metal edge of the trigger is fairly blunt and does not allow for a clean or easy cut of the cartridge tip. In other cases, a razor blade is spot or projection welded onto the opposing trigger edge to serve as a shearing blade. Alternatively, it is possible to sharpen the edge of the trigger. Either way, the trigger-mounted assembly results in a safety hazard to the operator, especially if the sharpened edge of the trigger or razor blade is exposed.

It would be greatly advantageous to provide a tip cutting assembly of improved effectiveness and safety for both molded open-frame as well as closed metal frame guns as described above.

SUMMARY OF THE INVENTION

In accordance with the above, it is an object of the present invention to provide simple, inexpensive and efficient tip cutting assemblies to allow an operator to cut the tip of a fresh cartridge of caulk prior to insertion in the barrel.

It is another object to provide tip cutting assemblies of improved effectiveness and safety for both molded open-frame caulking guns as well as closed metal frame guns.

The above and other objects and advantages of the invention will become more readily apparent on examination of the following description, including the drawings, in which like reference numerals refer to like parts. For the purpose of illustration, the tip cutting assemblies are shown in the context of caulking guns having either metal or single piece molded plastic open frame adapted for receiving a disposable cartridge. In both cases a thrust mechanism is supported in the frame and is actuated by a downwardly extending trigger to drive a plunger shaft that is slidably supported in the frame. A piston is mounted on the distal end of the plunger shaft and, when advanced through the frame and cartridge, dispenses caulking composition from the replaceable cartridge. The improvement disclosed herein includes safe, efficient, and economical tip cutting assemblies for severing the tips of fresh caulk cartridges prior to insertion and use in the caulk gun.

In one embodiment for a molded open-frame gun, the cartridge tip cutting assembly includes a cutting bracket attached to the frame and having an aperture there through for insertion of the cartridge tip. The cutting bracket includes one or more supports for maintaining it stationary against the frame. The cutting assembly also includes a blade assembly attached to the trigger. The blade assembly extends a blade outward from the trigger, enclosed between said frame and cutting bracket, and moveable by operation of the trigger across the aperture. In operation, a cartridge tip can be cut by insertion in the aperture of the cutting bracket, and by retraction of the trigger such that the blade cuts scissor-like across the aperture and through the tip.

Another embodiment is for a closed metal-frame gun having an enclosed housing with a downwardly extending handle, a trigger pivoted to the housing and retractable against the handle, a plunger shaft slidably supported in the housing, and means in said housing for advancement of the plunger shaft when the trigger is retracted. In this embodiment, the cartridge tip cutting assembly includes an aperture through a side of the housing for insertion of a cartridge tip, and a tip-cutting member formed with a through-hole to pass the plunger shaft and riding thereon within the housing. The means for advancement of the plunger shaft (when the trigger is retracted) may be a conventional metal grip, in which case the tip-cutting member may be formed integrally with the grip to serve dual purposes. Alternatively, the tip-cutting member may be a separate component. In either case, the tip-cutting member extends a cutting blade flush along the inner surface of the housing, and the tip-cutting member is moveable by operation of the trigger across the aperture. A fresh cartridge tip can be cut by insertion in the aperture of the housing and by retraction of the trigger such that the tip-cutting member cuts scissor-like across the aperture and through the tip.

Both of the subsequently described tip cutting assemblies and their functional equivalents allow an operator to cut the tip of a fresh cartridge of caulk prior to insertion in the barrel. They are simple, safe to use, inexpensive to manufacture, and highly effective. Their simplicity allows them to be manufactured OEM or retrofit for minimal additional cost.

DETAILED DESCRIPTION OF THE PREFERRED EMBODIMENTS

Figure 1:
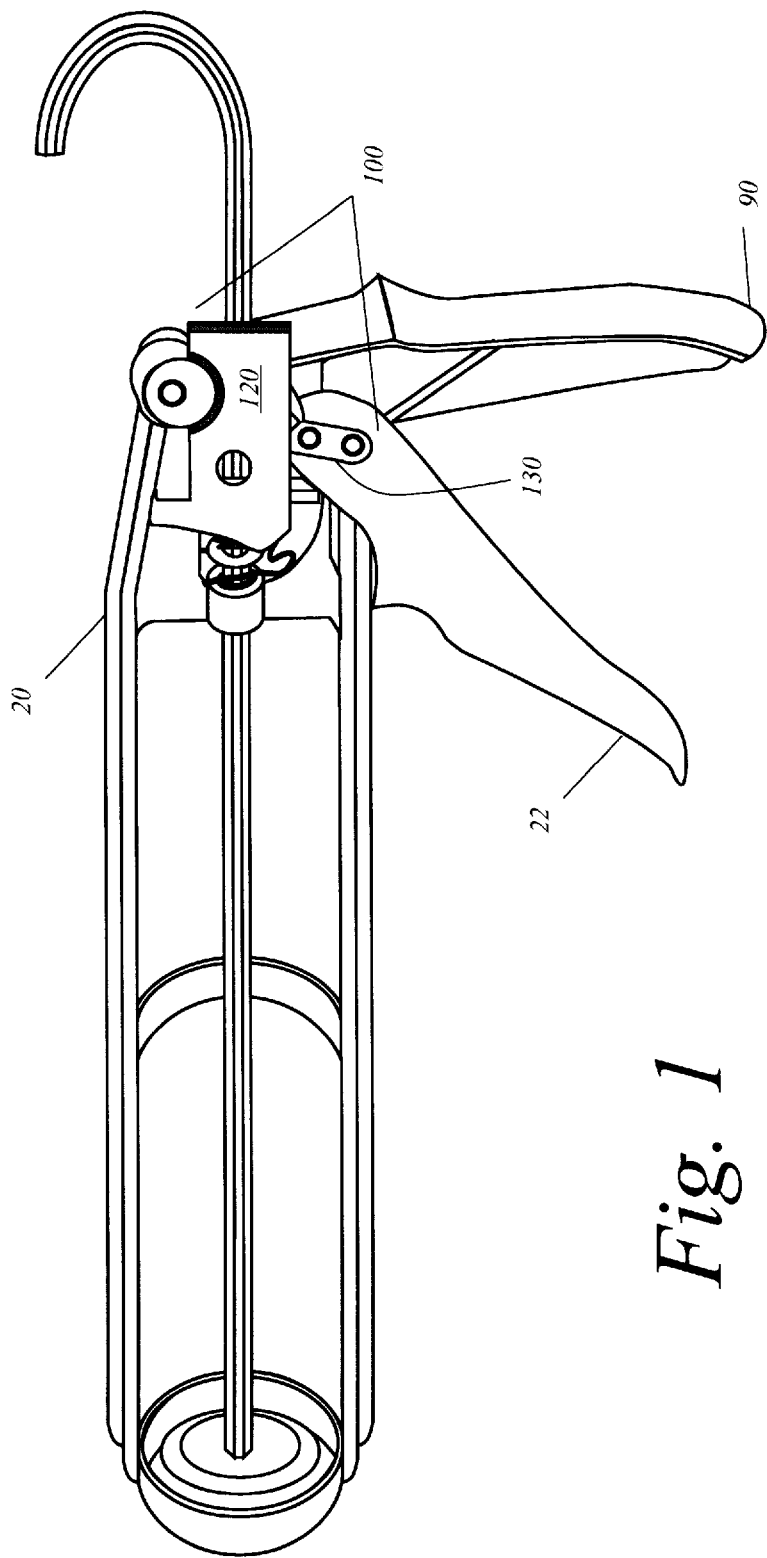
FIG. 1 is a side perspective view of a molded open-frame hand-held caulk gun with downwardly-pivoted trigger as shown in FIG. 1 of co-pending application Ser. No. 08/586, 187, filed Jan. 16, 1996, by the present inventor. The illustrated gun incorporates a cartridge tip-cutting assembly 100 according to one embodiment of the present invention.
Figure 9:
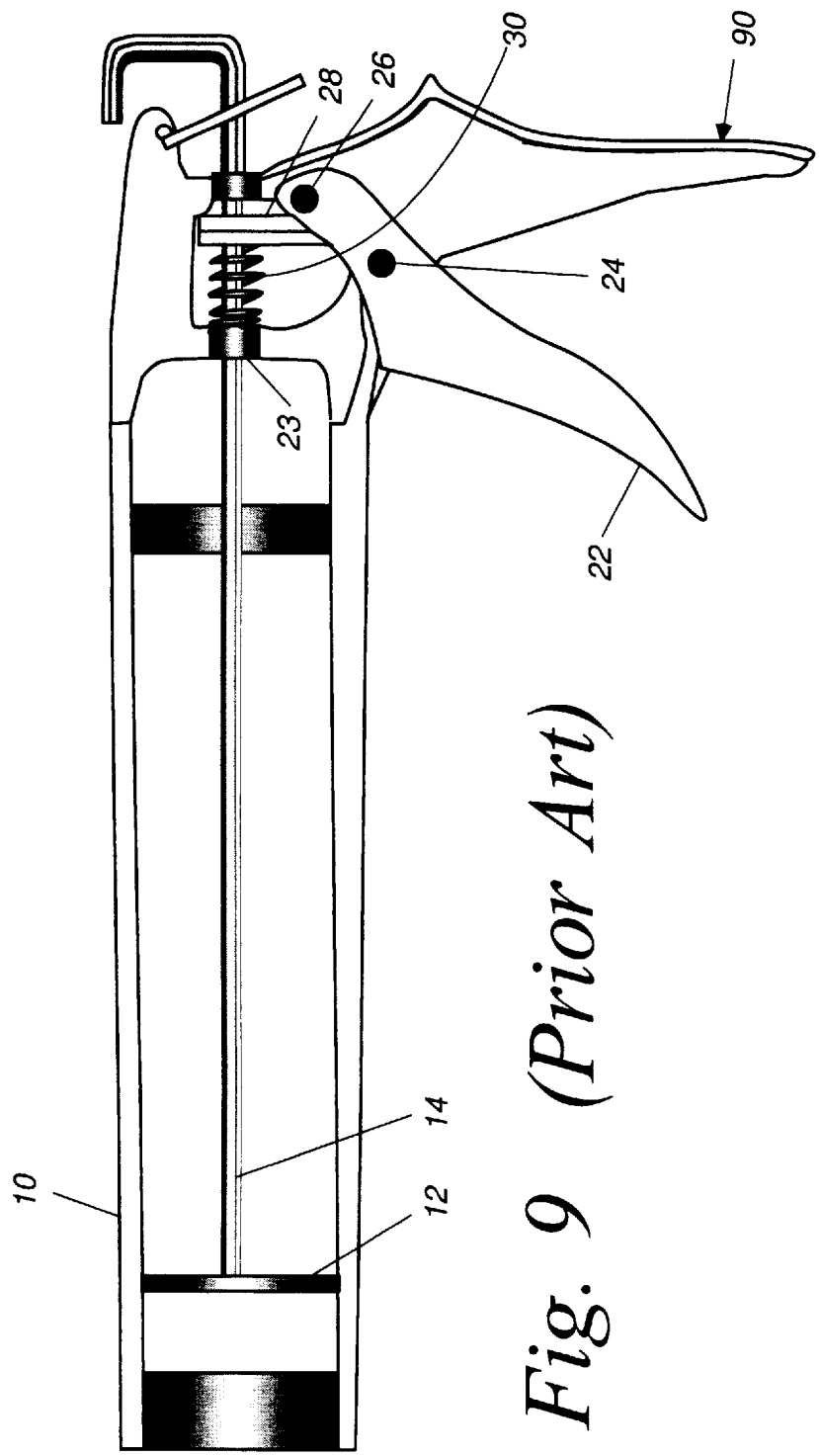
FIG. 9 is a side perspective view of a prior art molded open-frame caulk gun.
Figure 10:
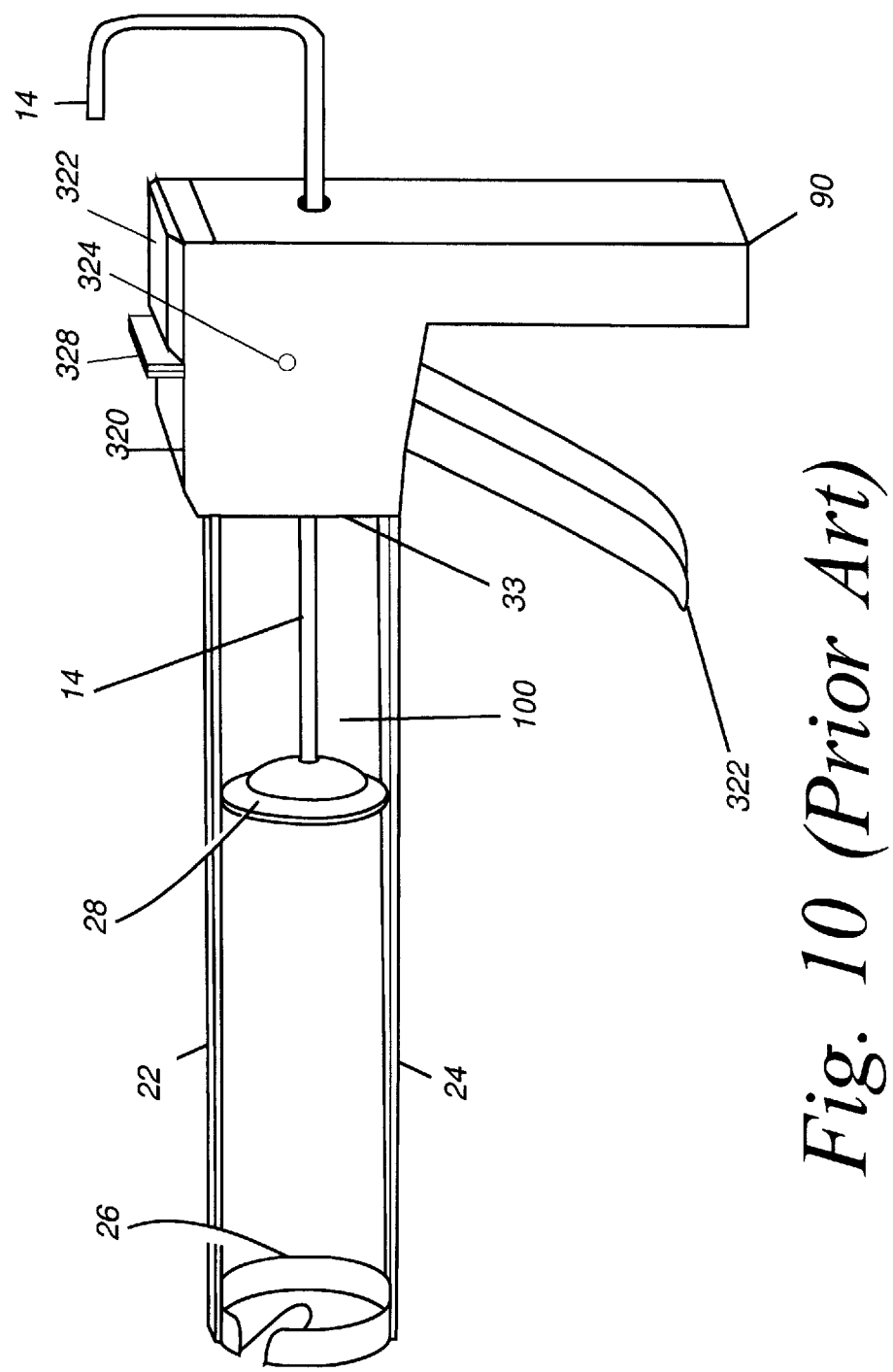
FIG. 10 is a side perspective view of a prior art closed metal-frame hand-held caulk gun.

FIG. 1 is a side perspective view of a molded open-frame hand-held caulk gun with open frame housing, downwardly extending handle 90, and downwardly-pivoted trigger similar to that shown in FIG. 9. The gun illustrated herein incorporates a unique cartridge tip-cutting assembly 100 in accordance with one embodiment of the present invention. Cartridge tip-cutting assembly 100 generally includes a cutting bracket 120 which is affixed relative to the rearward portion of frame 20, and a blade assembly 130 that is attached to the upper portion of trigger 22.

Figure 2:
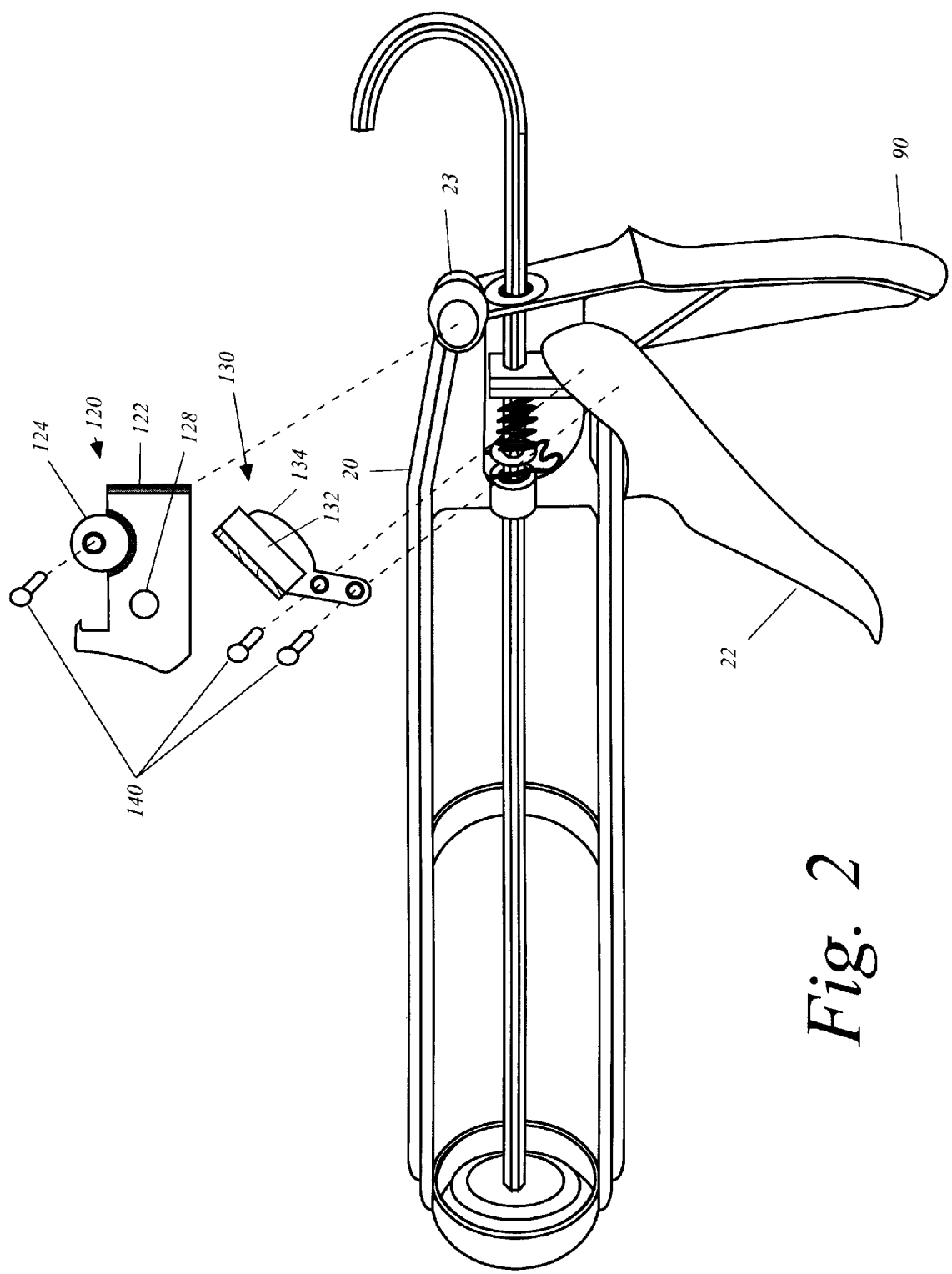
FIG. 2 is a side break-away view of the cartridge tip-cutting assembly 100 of FIG. 1.

FIG. 2 is a side break-away view of the cartridge tip-cutting assembly 100 of FIG. 1. Cutting bracket 120 is formed of metal or other rigid material and is defined by a central through-hole 128 for insertion of the tip of a conventional caulk cartridge. Cutting bracket 120 is attached to the plastic frame 20 of the gun by means of one or more conventional rivet(s) 140 or other suitable anchoring means. It is important that the cutting bracket 120 be securely anchored to frame 20 in order to resist rotational forces incurred while cutting. On the other hand, the manner of attachment should not unduly complicate manufacturing or assembly. The illustrated layout of the cutting bracket 120 accomplishes both objectives in the context of the illustrated molded open frame. This is accomplished by an arrangement of integral structural supports which conform to the existing frame design. Upper support 126 protrudes upwardly and is angled inward to provide a footing beneath an upper plastic rib of the existing frame 20. Rearward support 122 is provided by bending inward the rearward edge of the cutting bracket 120 such that it servers as a footing against a rearward rib on the handle of the existing frame 20. A depressed circular section 124 with central through-hole conforms to an existing knob 23 on frame 20. The depressed circular section 124 is riveted or otherwise fastened against knob 23 via the through-hole. When riveted in place, the cutting bracket 120 resists rotational forces by its integral structural supports, the upper support 126 being buttressed beneath the upper plastic rib and rearward support 122 being buttressed against the rearward handle rib of the existing frame 20.

Cutting blade assembly 130 comprises a flat metal stem 134 preferably with at least two through-holes to allow attachment by rivets 140 or other fastening means to trigger 22. One such hole preferably doubles as the normal trigger pivot for trigger 22. This allows the trigger 22 to be pivotally attached to the frame 20 of the gun by one of the same rivets 140 securing the cutting blade assembly 130 to the trigger 22. A flat razor-like blade 132 is attached to the upward extension of the stem 134 of cutting blade assembly 130, and the stem may be angled as shown to make a more leveraged cut. Blade 132 may be integrally formed with stem 134 or, alternatively, may be a separate part attached by spot welding or the like.

Figure 3:
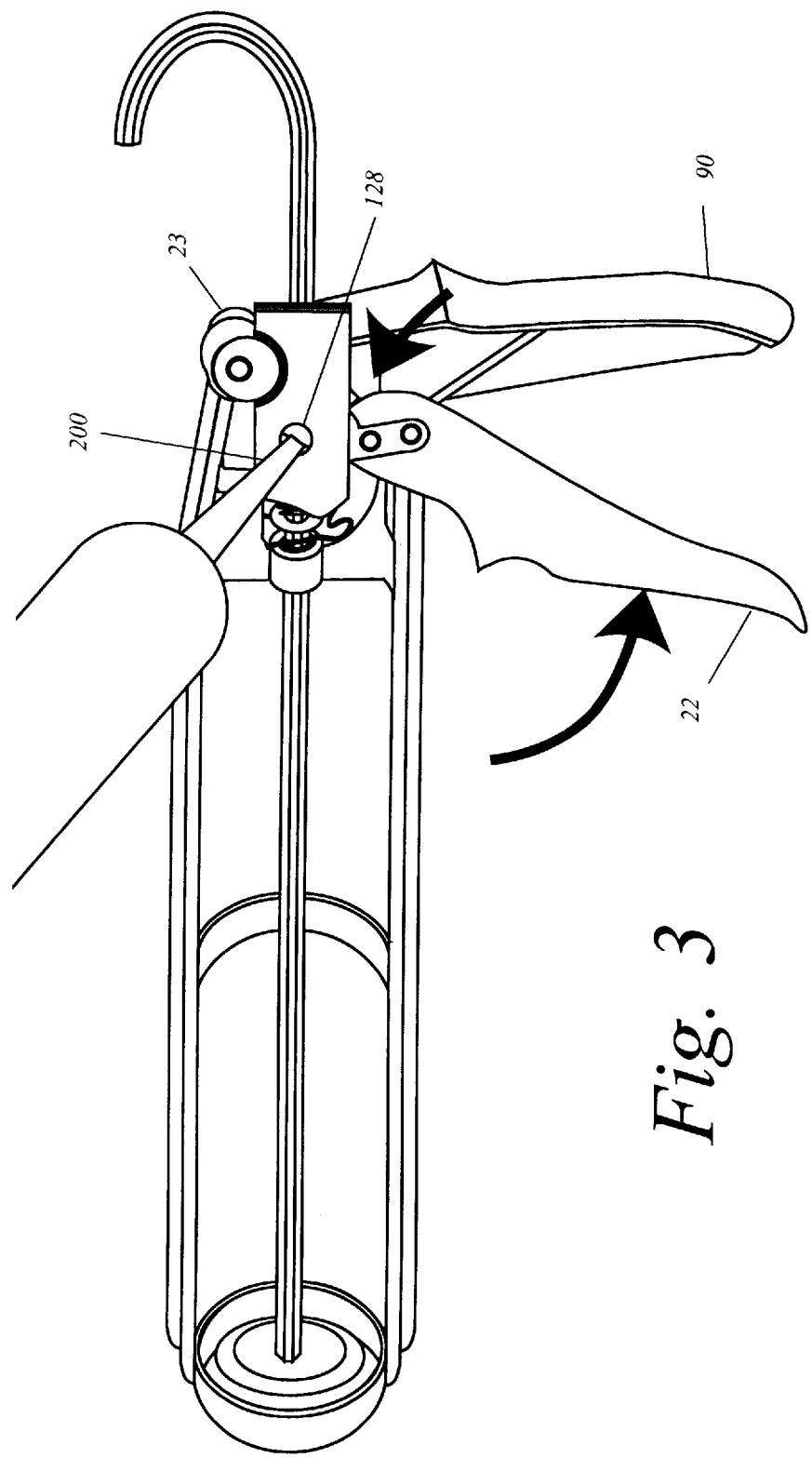
FIG. 3 is a side perspective view illustrating the operation of the cartridge tip-cutting assembly 100 of FIGS. 1 and 2.

FIG. 3 is a side perspective view illustrating the operation of the cartridge tip-cutting assembly 100 of FIGS. 1 and 2. In operation, a conventional caulk cartridge tip 200 is inserted in the central hole 128 of the cutting bracket 100. The trigger 22 is retracted by hand and pivots counterclockwise about its pivot point. The cutting blade assembly 130 is carried on the upper portion of trigger 22 between the plastic frame 20 and cutting bracket 100. The blade 132 slides against the inner surface of cutting bracket 120 and is driven through the inwardly protruding tip 200 to complete its cut. The caulk cartridge can be removed and inserted into the barrel of the gun for use. The severed section of cartridge tip falls through the bottom portion of the open frame.

Figure 4:
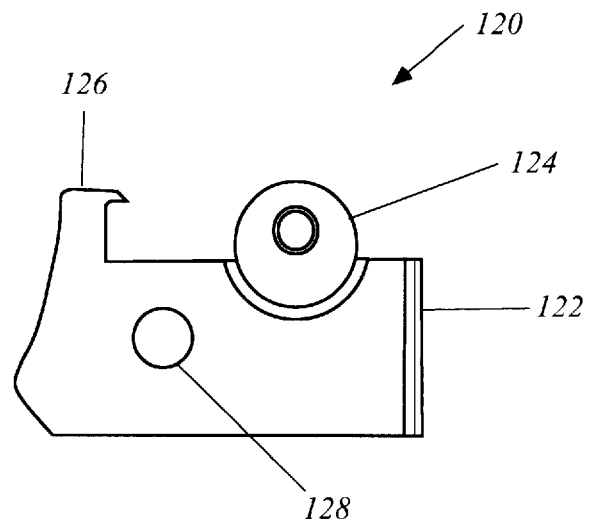
FIGS. 4 and 5 are a side view and top view, respectively, of the tip-cutting bracket 120 as employed in the cartridge tip-cutting assembly 100 of FIGS. 1 and 2.
Figure 5:
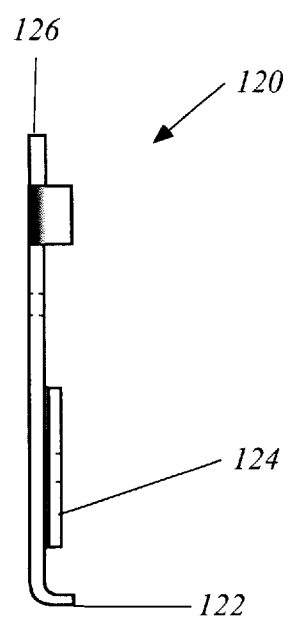

FIGS. 4 and 5 are a side view and top view, respectively, of the tip-cutting bracket 120 as employed in the cartridge tip-cutting assembly 100 of FIGS. 1 and 2. The cutting bracket 120 may be formed, for instance, by stamping an integral flat section of steel. The stamping yields the protruding section of upper support 126 which is dimensioned in accordance with the frame of the gun to provide a footing beneath the upper plastic rib of the existing frame 20. The stamping also bends the rearward edge of the cutting bracket 120 inward to form rearward support 122 which serves as a footing against the rearward handle rib of the existing frame 20. The stamping also depresses the circular section 124 and imparts a central through-hole therein. The central hole 128 of the cutting bracket 100 is positioned relative to the blade 132 of cutting blade assembly 130 to ensure that the blade 132 cuts fully across central hole 128. The location of the central hole 128 should be precise because the grip must not obstruct more than one-third of the hole 128. At least two-thirds of hole 128 must remain open for proper insertion of the cartridge tip. If the hole is not located as described, the tip cannot be inserted deeply enough.

The leverage of the trigger-mounted blade assembly combined with the sharpness of the blade 132 results in an effortless cut. Moreover, the blade is protected behind the cutting bracket 120 and there is absolutely no safety hazard to the operator.

Figure 6:
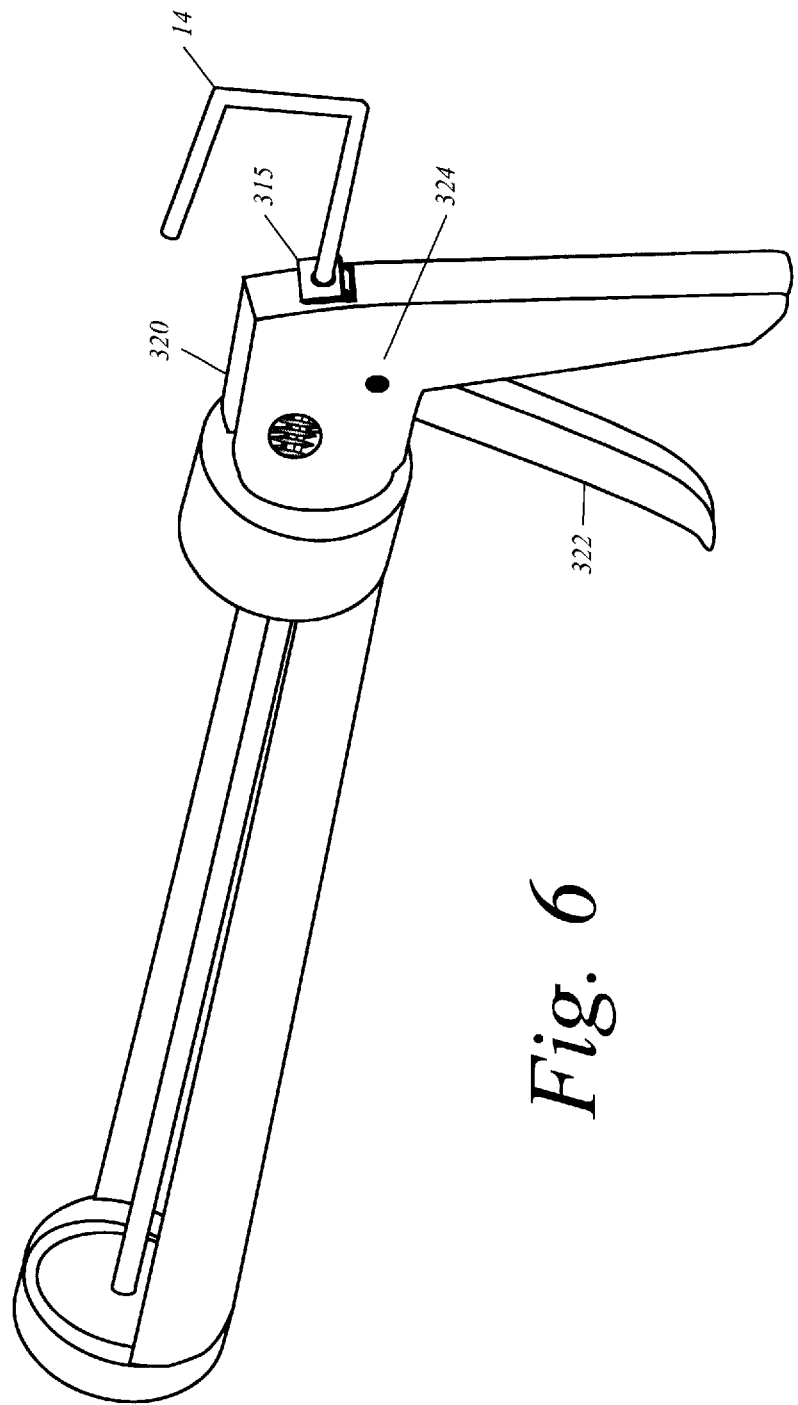
FIG. 6 is a side perspective view of a metal closed-frame hand-held caulk gun with downwardly-pivoted trigger as shown in FIG. 9 of co-pending application Ser. No. 08/586, 187, filed Jan. 16, 1996, by the present inventor.

It is desirable to incorporate an equally advantageous tip cutting assembly in a metal closed-frame gun as shown in FIG. 6, which is a side perspective view of an existing closed metal-frame gun. As seen in FIG. 6, the closed-frame metal gun includes a plunger shaft 14 carried in a closed frame housing 320, and a trigger 322 pivoted at a screw hinge 324 located below plunger shaft 14. An enlarged upper portion of trigger 322 extends past screw hinge and bears against an internal grip 328 for advancing the plunger shaft 14. A release-lever 315 encircles plunger shaft 14 at the rear of housing 320 to prevent rearward retraction of the plunger shaft 14 until intentionally released by thumb-depression of the operator.

Figure 7:
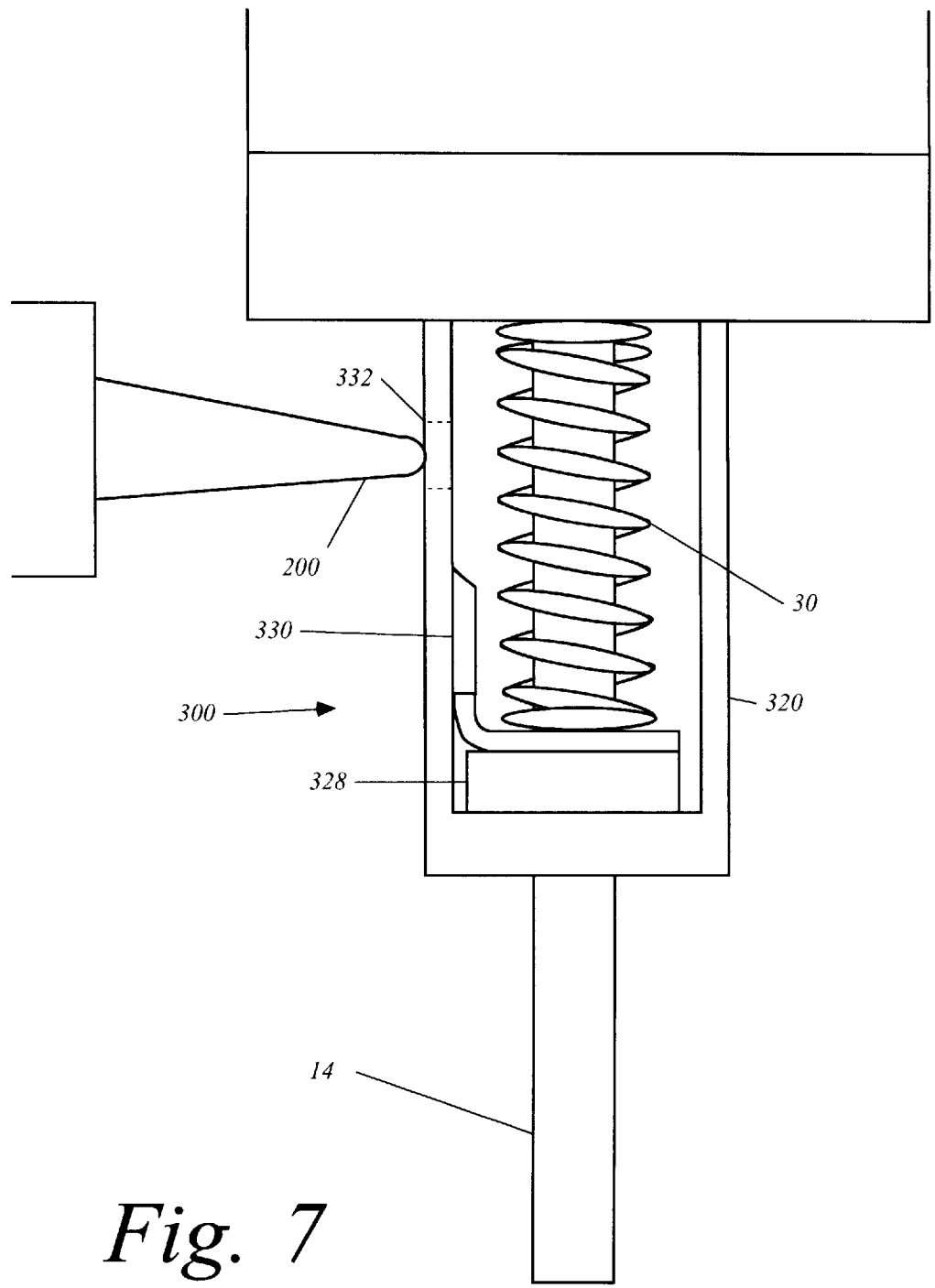
FIG. 7 is an enlarged overhead view of the drive mechanism in the metal closed-frame hand-held caulk gun of FIG. 6 with a cartridge tip-cutting assembly according to a second embodiment of the present invention.

FIG. 7 is an enlarged overhead view of the caulk gun of FIG. 6 with a cartridge tip-cutting assembly 300 according to a second embodiment of the present invention. FIG. 7 also gives an overhead view of the existing plunger drive mechanism including grip 328, which is a flat elongate metal plate contained within housing 320 and having a through-bore to pass plunge shaft 14. It should be understood that double grips are sometimes used, and these are formed simply by sandwiching two identical internal grips 328 (lengthwise). The double grip configuration helps to prolong the wear of the holes and provides a better gripping action at the critical angle. A compression spring 30 oppositely biases the grip 328 toward the rear of the housing 320.

Both forward and rearward operation of the plunger drive shaft 14 is accomplished in substantially the same manner as described with regard to the foregoing open-frame gun. The cartridge tip-cutting assembly 300 is incorporated to allow the operator to complete an effortless and safe cut of the caulk cartridge tip prior to insertion in the barrel. The tip cutting assembly as seen in FIG. 7 includes a cutting blade assembly 330 and central through-hole 332.

Central through-hole 332 is formed through the side of the rear housing 320 for insertion of the tip 200 of a conventional caulk cartridge.

Cutting blade assembly 330 comprises a simple tip-cutting member 330 formed as a unitary piece, having a through-hole to pass the plunger shaft 14, and brandishing a cutting blade along the inner surface of housing 320 proximate the central hole 322. In the embodiment of FIG. 7, the tip-cutting member 330 is separate from grip 328. In this case, both the tip-cutting member 330 and grip 328 protrude downward and encircle the plunger shaft 14 forwardly of the enlarged upper portion of trigger 322. Consequently, the enlarged upper portion of trigger 322 bears directly against the internal grip 328 for advancing the plunger shaft 14, and the tip-cutting member 330 rides forwardly on the grip 328. In this manner, the tip-cutting member 330 serves a dual purpose not only to cut, but also to act as a double grip or "friction plate". Conventional double grips exist currently and are formed by sandwiching two identical internal grips 328. These help to prolong the wear of the moving members and to provide a better gripping action at the critical angle. The same advantages of a double grip are realized by providing a separate tip-cutting member 330 which acts as a grip as well as a cutting member. Alternatively, a single-grip design may be employed in which the tip-cutting member 330 is joined with formed integrally to take the place of grip 328. In this case the above-described benefit of a dual grip or friction plate are foregone, but the design is more economical since the tip-cutting member 330 will serve the dual purpose of grip and cutting member. There is no need for a separate internal grip 328.

In either the dual- or single-grip configuration, the tip-cutting member extends a cutting blade flush along the inner surface of the housing, and the tip-cutting member is moveable by operation of the trigger across the aperture.

Figure 8:
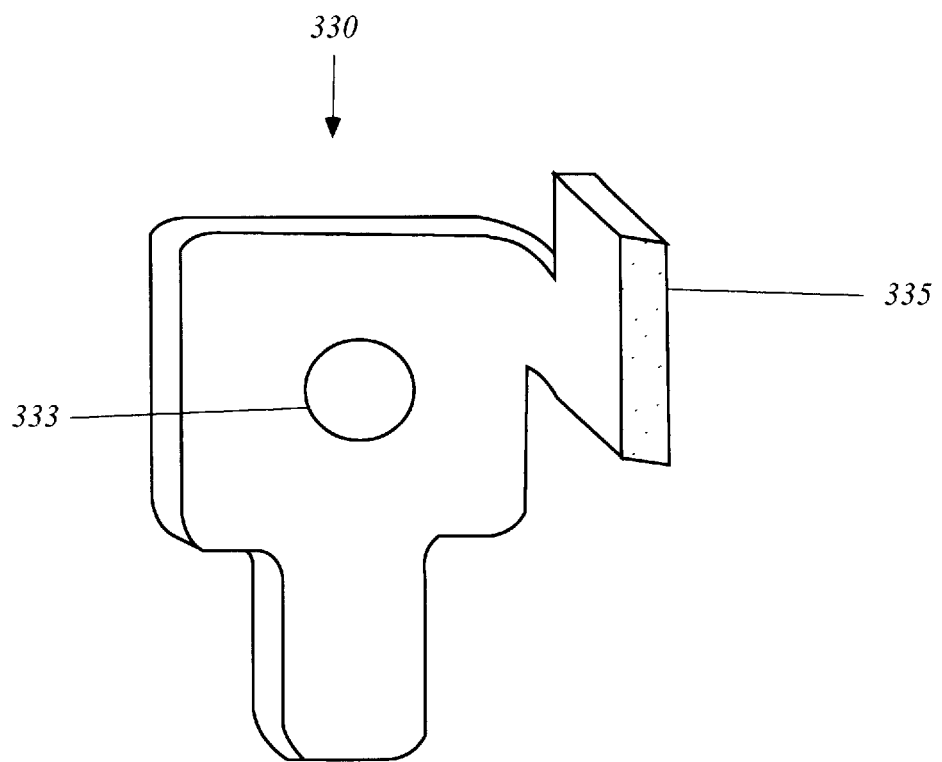
FIG. 8 is a perspective view of an exemplary tip-cutting bracket 330 (formed as a separate component from grip) as employed in the cartridge tip-cutting assembly of FIG. 7.

FIG. 8 is a perspective view of the tip-cutting blade assembly 330 as employed in a dual-grip configuration cartridge tip-cutting assembly as in FIG. 7. Cutting blade assembly 330 may be formed from an integral metal section defined by through-hole 333 which passes the plunger shaft 14 and guides blade assembly 330 therealong. The side of the tip-cutting blade assembly 330 corresponding to the hole 332 in housing 320 includes a cutting blade extension which carries a blade 335 parallel to the housing 320 and preferably in abutment there against. The central hole 332 of the housing 320 is positioned relative to the blade 335 of cutting blade assembly 330 to ensure that the blade 335 cuts fully across central hole 332.

Referring collectively to FIGS. 6–8, the operation of the tip-cutting blade assembly is as follows. The caulk cartridge tip 200 to be cut is inserted into the hole 332 in housing 320. The trigger 322 is retracted by hand and pivots counter-clockwise about screw hinge 324. The top edge of the upper portion of trigger 322 bears against grip 328 and urges it forward. As grip 328 is biased forward, it in turn biases cutting blade assembly 330 forward and blade 335 is urged forward across the inner surface of housing 320 such that it cuts across hole 332 (and through tip 200). The leverage of the cutting blade assembly 330 combined with the sharpness of the blade 335 results in an effortless cut. Moreover, the blade 335 is protected behind the gun's housing 320 and there is absolutely no safety hazard to the operator. In addition, the dual-grip configuration (whereby the tip-cutting member serves as a friction plate) helps to prolong the wear of the moving members (the grip holes do not wear as quickly) and provides a better gripping action at the critical angle.

Having now fully set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

I claim:

1. A cartridge tip cutting assembly for cutting a tip of a replaceable cartridge prior to insertion in a dispensing gun, said gun having a trigger pivotally mounted to a frame, the cartridge tip cutting assembly comprising:

a cutting bracket attached to said frame and having an aperture there through above said trigger pivot for insertion of said cartridge tip, said cutting bracket including means for anchoring the cutting bracket against said frame for maintaining the cutting bracket stationary relative to said frame;

a blade assembly attached to said trigger, said blade assembly including a forwardly exposed blade extending upwardly from said trigger above said trigger pivot and enclosed between said frame and cutting bracket, said blade being forwardly moveable by retraction of said trigger to cut across said aperture;

whereby a cartridge tip is cut by insertion in the aperture of said cutting bracket and by retraction of said trigger such that said blade cuts across said aperture and through said tip.

2. The cartridge tip cutting assembly according to claim 1, wherein said cutting bracket attached to said frame houses said blade assembly and shields said blade assembly while said blade cuts across said aperture and through the cartridge tip.

3. The cartridge tip cutting assembly according to claim 1, wherein said means for anchoring said cutting bracket against said frame to maintain it stationary relative thereto include an upward protrusion to form an abutment against an upper portion of said frame and a rearward protrusion to form an abutment against a rearward portion of said frame.

4. The cartridge tip cutting assembly according to claim 1, wherein said means for anchoring said cutting bracket against said frame further includes at least one rivet for securing said cutting bracket against said frame.

5. The cartridge tip cutting assembly according to claim 1, wherein said blade assembly includes a stem attached to said trigger, and a blade attached to said stem and extending outward from said trigger.

6. The cartridge tip cutting assembly according to claim 5, wherein said stem is anchored to said trigger.

7. The cartridge tip cutting assembly according to claim 6, wherein said stem is riveted to said trigger.

* * * * *